(12) United States Patent
Wallius et al.

(10) Patent No.: US 10,136,120 B2
(45) Date of Patent: Nov. 20, 2018

(54) DEPTH SENSING USING STRUCTURED ILLUMINATION

(71) Applicant: Microsoft Technology Licensing, LLC, Redmond, WA (US)

(72) Inventors: Samuli Wallius, Turku (FI); Mikko Juhola, Salo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 15/130,908

(22) Filed: Apr. 15, 2016

(65) Prior Publication Data

US 2017/0302907 A1   Oct. 19, 2017

(51) Int. Cl.
| | |
|---|---|
| *H04N 13/239* | (2018.01) |
| *G01B 11/22* | (2006.01) |
| *H04N 13/254* | (2018.01) |
| *H04N 5/225* | (2006.01) |
| *H04N 5/33* | (2006.01) |
| *G01B 11/25* | (2006.01) |
| *G06T 7/00* | (2017.01) |
| *G01B 9/02* | (2006.01) |

(52) U.S. Cl.
CPC ....... *H04N 13/239* (2018.05); *G01B 9/02054* (2013.01); *G01B 11/22* (2013.01); *G01B 11/2513* (2013.01); *G06T 7/00* (2013.01); *H04N 5/2256* (2013.01); *H04N 5/33* (2013.01); *H04N 13/254* (2018.05)

(58) Field of Classification Search
CPC .................................................. H04N 13/0239
See application file for complete search history.

(56) References Cited

U.S. PATENT DOCUMENTS 4,387,994 A * 6/1983 Balasubramanian ........................ G01B 11/303 356/513
5,361,308 A * 11/1994 Lee ..................... G01B 11/2441 348/131

(Continued)

FOREIGN PATENT DOCUMENTS

WO      2014204623 A1   12/2014

OTHER PUBLICATIONS

"International Search Report and Written Opinion Issued in PCT Application No. PCT/US2017/026878", dated Jun. 14, 2017, 14 Pages.

(Continued)

*Primary Examiner* — David Porta
*Assistant Examiner* — Jeremy S Valentiner

(57) ABSTRACT

A mobile or portable device comprises an illuminating arrangement comprising a light source, and an amplitude splitting interferometer configured to form an interferogram of light emitted by the light source. The illuminating arrangement is configured to illuminate a target region lying at a distance of at least 10 cm from the device by the interferogram, thereby projecting a structured light pattern onto the target region. The device further comprises an image sensor configured to capture at least one digital image frame of the target region illuminated by the interferogram, and a processing unit configured to obtain image data of the at least one digital image frame, and determine depth of at least one object location in the target region relative to a reference location on the basis of the obtained image data.

20 Claims, 3 Drawing Sheets

(56) References Cited

U.S. PATENT DOCUMENTS

| | | |
|---|---|---|
| 6,525,824 B1 | 2/2003 | Gutierrez |
| 6,549,288 B1 | 4/2003 | Migdal et al. |
| 6,744,517 B1 | 6/2004 | Forno et al. |
| 7,230,717 B2 | 6/2007 | Brock et al. |
| 7,385,708 B2 | 6/2008 | Ackerman et al. |
| 7,414,708 B2 | 8/2008 | Bivolaru et al. |
| 7,564,568 B2 | 7/2009 | De Groot et al. |
| 7,948,636 B2 | 5/2011 | De Groot et al. |
| 8,072,608 B2 | 12/2011 | Steffens et al. |
| 8,174,761 B2 | 5/2012 | Amberger et al. |
| 8,401,242 B2 | 3/2013 | Newcombe et al. |
| 8,427,636 B2 | 4/2013 | Prince et al. |
| 8,526,008 B2 | 9/2013 | Cobb et al. |
| 8,970,676 B2 | 3/2015 | Bloom et al. |
| 2006/0072122 A1* | 4/2006 | Hu .................... G01B 11/2527 356/603 |
| 2007/0263204 A1 | 11/2007 | Ju |
| 2011/0216324 A1 | 9/2011 | Arieli et al. |
| 2012/0051588 A1* | 3/2012 | McEldowney ........ G03B 17/54 382/103 |
| 2012/0056982 A1 | 3/2012 | Katz et al. |
| 2013/0141712 A1* | 6/2013 | Blain .................. G01B 11/162 356/34 |
| 2013/0293700 A1 | 11/2013 | Yang |
| 2014/0128743 A1 | 5/2014 | Yew et al. |
| 2014/0168370 A1 | 6/2014 | Heidemann et al. |
| 2015/0015701 A1* | 1/2015 | Yu ........................ H04N 5/2259 348/136 |
| 2016/0262521 A1* | 9/2016 | Kustra ................... A45D 24/36 |

OTHER PUBLICATIONS

Koifman, Vladimir, "Mantis Vision's Structured Light 3D Camera Used in Google's Project Tango Tablets", Published on: Jun. 6, 2014, 6 pages, Available at: http://image-sensors-world.blogspot.in/2014/06/mantis-visions-structured-light-3d.html.

Stoller-Conrad, Jessica, "New Camera Chip Provides Superfine 3-D Resolution", Published on: Mar. 4, 2015, 2 pages, Available at: http://www.caltech.edu/news/new-camera-chip-provides-superfine-3-d-resolution-46425.

Mather, Lee, "Taylor Hobson Interferometer features 4 Mpixel Camera", Published on: Sep. 28, 2010, 3 pages, Available at: http://www.laserfocusworld.com/articles/2010/09/taylor-hobson-interferometer-features-4-mpixel-camera.html.

Billingsley, Sam, "Big News from Mantis Vision", Published on: Jun. 25, 2014, 2 pages, Available at: http://www.sparpointgroup.com/sam-billingsley-jr/big-news-from-mantis-vision.

Choi, et al., "Depth Resolved Hyperspectral Imaging Spectrometer based on Structured Light Illumination and Fourier Transform Interferometry", In Journal of Biomedical Optics Express, vol. 5, Issue 10, Sep. 9, 2014, pp. 3494-3507.

Shao, et al., "Interferometer-based Structured-Illumination Microscopy Utilizing Complementary Phase Relationship through Constructive and Destructive Image Detection by two Cameras", In Journal of Microscopy, vol. 246, Jun. 2012, pp. 229-236.

Saxena, et al., "Structured Illumination Microscopy", In Journal of Advances in Optics and Photonics, vol. 7, Issue 2, May 26, 2015, pp. 241-275.

* cited by examiner

DEPTH SENSING USING STRUCTURED ILLUMINATION

BACKGROUND

In various portable and mobile devices, camera based systems may be incorporated which are configured to serve for depth sensing of objects present in a target region shot by the camera. The depth sensing may be carried out on the basis of one or more digital images captured by the camera of the target region while illuminating the target region by structured illumination. The depth information generated by the depth sensing may be used for various purposes and applications, such as three dimensional mapping of the target region, distance measurements, and gesture based user interfaces, to mention few examples.

Accuracy and reliability of the depth sensing may be affected by the accuracy and stability of the structured illumination projected as structured light pattern(s) onto the target region.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A device is disclosed which may be used for depth sensing purposes, for example, for distance or displacement measuring or three dimensional mapping of target regions or specific objects present in such target regions, motion or gesture sensing, etc. The device may be a portable or mobile device, such as a mobile phone, a smart phone, a laptop computer, a tablet computer, a game controller, a game console, and a portable or mobile depth sensing device.

The device may comprise an illuminating arrangement comprising a light source, and an amplitude splitting interferometer configured to form an interferogram of light emitted by the light source. The illuminating arrangement may be configured to illuminate a target region at a distance of at least 10 cm from the device by the interferogram, thereby projecting a structured light pattern onto the target region.

The device may further comprise one or more image sensors configured to capture at least one digital image frame of the target region illuminated by the interferogram. Further, the device may comprise a processing unit configured to obtain image data of the at least one digital image frame, and determine depth of at least one object location in the target region relative to a reference location on the basis of the obtained image data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 5, the devices, imaging modules, and illuminating arrangements are illustrated as schematic drawings. The drawings are not in scale.

DETAILED DESCRIPTION

The detailed description provided below in connection with the appended drawings is intended as a description of a number of embodiments and is not intended to represent the only forms in which the embodiments may be constructed, implemented, or utilized.

Figure 1:
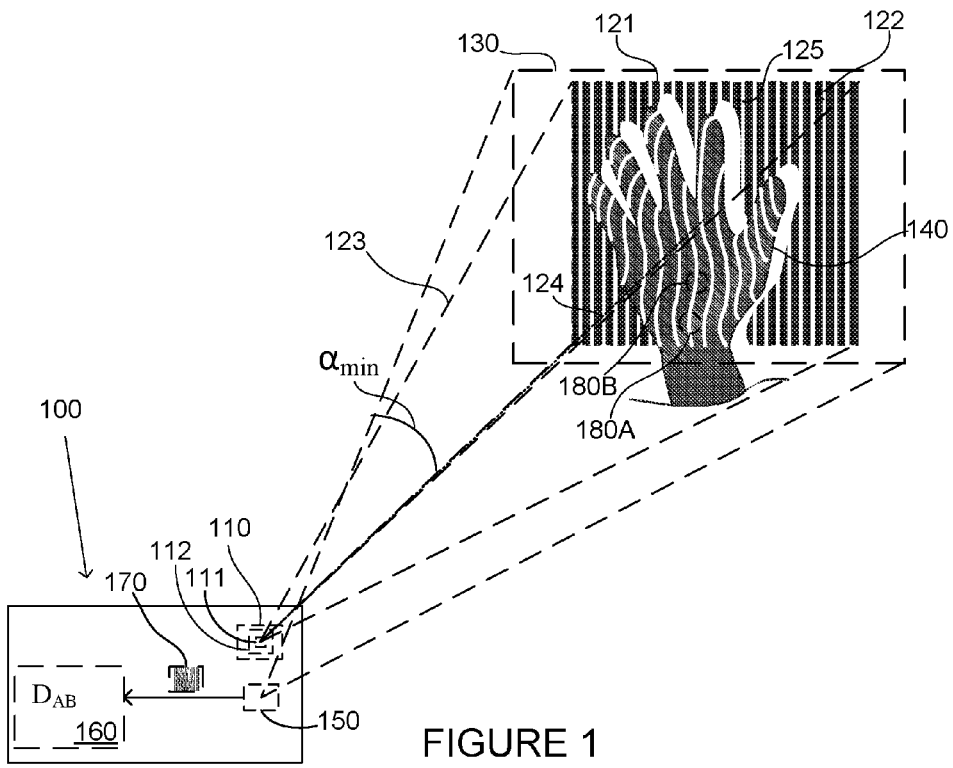
FIGS. 1 and 2, and 5 illustrate devices and imaging modules capable of carrying out depth sensing.

The device 100 of FIG. 1 comprises an illuminating arrangement 110 comprising a light source 111 and an interferometer 112 which is of amplitude splitting type. The interferometer is capable of forming an interferogram 121 of the light initially emitted by the light source.

The illuminating arrangement as a whole is configured to distribute the interferogram into an illuminating light beam 123 around an illuminating axis 124. Thereby, the illuminating arrangement may illuminate a target region 130, which lies at a distance of 10 cm or more from the device 100, by the interferogram 121. Then, the interferogram forms a structured light pattern 122 projected onto the target region, the structured light pattern having areas with different light intensities. Said illumination by the interferogram may be regarded as structured illumination.

The light source may comprise any light generating and/or emitting element(s) or component(s) capable of emitting light of which an interferogram may be formed by the amplitude splitting interferometer. The light emitted by the light source may be coherent. The light source may comprise, for example, a light emitting diode LED or a laser, such as a laser diode, equipped with any appropriate optics if needed. The light source may also another type(s) of light emitting element(s) having a larger area than LED or a laser diode. Using such light source, coherent or substantially coherent light may be produced by use of a narrow slit or a tiny hole through which the initially emitted light propagates, the slit or the hole thereby operating as a line or point source.

An "amplitude splitting interferometer" refers to an interferometer in which the intensity of light in a specific area is first split into two portions guided to propagate along different paths, after which the split portions are interferometrically recombined to form an interferogram. An amplitude splitting interferometer may be implemented as a non-diffractive interferometer, i.e. an interferometer where interference is based on optical phenomena different from diffraction of light.

Said splitting of the intensity from a single area into two portions and later recombining of such different portions may be achieved, for example, by using a partial reflector or semi-transparent mirror. Before splitting and after recombining, the light may form a single illuminating light beam which, after recombining, comprises the interferogram.

The illuminating light beam may be collimated or, as in the embodiment illustrated in FIG. 1, it may be diverging, i.e. having a cross-section which expands when the distance from the illuminating arrangement increases.

In the embodiment of FIG. 1, the interferogram 121 by which the target region 130 is illuminated, thereby forming a structured light pattern 122 onto the target region, comprises an array of parallel, straight interference lines 125. In other embodiment, different interferograms may be utilized to form different kinds of structured light patterns. For example, a structured light pattern may be formed by a two-dimensional grid of two arrays of interference lines with different orientations. Further, the structured light pattern may be formed by interferogram(s) comprising interference lines in the form of interference rings.

In FIG. 1, a hand 140 is illustrated in the target region, representing generally a three dimensional object present in the target region. Naturally, any kind(s) of living or non-living object(s) may be present in the target region in different embodiments. The hand as an illuminated object could relate, for example, to use or implementation of the device 100 as a user input device such as a motion controller or another type of gesture-based user interface of an apparatus. In other embodiment, a device may be used, for example, for distance measuring, three dimensional mapping of a target region or object(s) therein, or for any other application where depth sensing is utilized.

The device comprises an image sensor 150 capable of capturing digital image frames 170 of a scene shot by the image sensor. The image sensor 150 is positioned off the illuminating axis 124 around which the illuminating light beam is distributed. Thus, it has a viewing direction differing from the direction of the illuminating axis 124.

A "digital image frame", or shortly a "frame", refers to a data content captured via exposure of pixels or some other light-sensing element(s) of an image sensor. A frame thus comprises image data enabling composition of a displayable digital image on the basis of that image data. Image data of a digital image may comprise, for example, information about energy and wavelength of light received by pixels of an image sensor.

The image sensor 150 may be incorporated in the device 100 as a plain image sensor, connected to appropriate control system to control the image sensor and to receive the image data of frames captured by it. External optics may be contained in the device to serve for, for example, focusing an image of a scene onto the image sensor. Alternatively, the image sensor may be implemented as a complete digital camera or camera module comprising, in addition to the actual image sensor, also any appropriate control electronics and optics. Such camera or camera module may further comprise, for example, an image processing unit.

The device comprises also a processing unit 160 connected to the image sensor to receive the image data of the digital image frames captured by the image sensor.

When the device is in use, the light source 111 emits illuminating light, of which the interferometer 112 forms the interferogram 121. The illuminating arrangement 110 illuminates the target region 130 by the interferogram, thereby projecting the structured light pattern 122 onto the target region. The light source may emit its light, and/or the illumination arrangement may illuminate the target region, in a continuous manner or as pulsed.

The image sensor 150 captures one or more digital image frames 170 of the target region 130 while the target region is illuminated by the interferogram 121.

The one or more image frames or at least the image data thereof is then transmitted to and obtained by the processing unit 160.

"Obtaining" the image data of the digital image frames or the image data thereof refers to any appropriate way of providing available, for automatic data processing by the and/or storage purposes, such data content. The device may comprise any appropriate wired or wireless data transmission connection between the image sensor and the processing unit.

On the basis of the obtained image data, the processing unit determines depth of at least object location 180A in the target region relative to a reference location.

"Depth" refers generally to three-dimensional characteristics of the target region and/or the object(s) present in the target region. The "reference location" refers to a location on a fictitious reference plane relative to which plane the depth of the object location is determined. All object locations lying on any single plane which is parallel to such reference plane have the same depth of zero. On the other hand, deviation of the object location from such reference depth results in a non-zero depth of the object location. The reference plane may be defined as lying in any direction deviating from direction of the illuminating axis 124.

In general, the reference location may be defined as coinciding with, or being otherwise related to, the location of the device. Then, the "depth" of the object relative to such reference location may be regarded as the distance of the object location from the device or from another reference location defined relative to the device. Such approach may be used, for example, in distance measuring applications where distances of objects present in the target region, or specific points of such objects, from the device are to be measured.

In the embodiment illustrated in FIG. 1, an alternative approach is used. The processing unit 160 determines the depth DAB of the object location 180A relative to a reference location 180B in the target domain. Such relative depth information can be used as such to indicate the depth of the object location 180A from the specific reference position. Alternatively, such relative depth information may be determined for a plurality object locations, whereby it is possible to determine the three-dimensional profiles of objects, such as the hand 140, present in the target region 130. Three-dimensional information may be used for various applications, such as three-dimensional mapping of surroundings of the device, or recognizing gestures or presence of a person, or a body part of a person, present in the target region.

In the actual depth determination, any algorithms, methods, and principles known for depth sensing utilizing structured illumination may be applied. The depth determination may be based on deformation, when observed by the image sensor from a viewing direction distinguishing from the direction of the illuminating axis 124 of the structured illumination, of the structured light pattern 122 projected onto one or more three dimensional object(s) present in the target domain. Such deformation is illustrated in FIG. 1 by bending of the interference lines on the hand 140 representing generally a three dimensional object present in the target region 130. In some applications, the depth sensing may be at least partially based on change of size of the features of the structured light pattern as function of distance of objects or object locations from the illumination arrangement.

The use of an interferogram as a basis for the structured light pattern, i.e. forming the structured illumination by means of an interferometer may provide certain advantages in determining the depth of the one or more object locations. For example, the operation of the amplitude splitting interferometer and thus the properties of the interferogram produced may be relatively insensitive to temperature changes or small deviations of the actual wavelength of the illumination light from the intended wavelength. Further, an interferogram can be implemented as a compact, miniaturized optical system which may facilitate incorporation of the illumination arrangement especially into mobile and portable devices with limited available space in and thickness of the devices.

The illuminating arrangement configured to illuminate a target region which lies at a distance of 10 cm or more from the illuminating arrangement may advantageously enable illumination of a great variety of different target regions, and depth sensing for a great variety of different purposes. The upper limit of the distance of the target region from the device or the illuminating arrangement may be mainly defined by the illumination light intensity available. The illuminating arrangement may be configured to illuminate target regions, for example, at distances of 10 cm to 10 m from the device or from the illuminating arrangement.

To facilitate depth sensing of various locations in the target region and to allow three dimensional mapping of large target regions, the field of illumination may be configured to be relatively wide. For example, the illuminating arrangement 110 may be configured to distribute the interferogram 121 into a field of illumination having its minimum angle $\alpha_{min}$ of 50 degrees or higher.

The "field of illumination" refers to the beam or cone into which the illuminating light comprising the interferogram is distributed or transmitted by the illumination arrangement. The field of illumination may be circularly symmetric, in which case the angle of the field of illumination is the same irrespective of the direction in which it is defined. Alternatively, the illuminating light may be distributed into a beam or cone having, for example, a rectangular cross-section. The embodiment illustrated in FIG. 1 represents an example of this type.

The "minimum angle" $\alpha_{min}$ of the field of illumination refers to the angle of the field of view illumination defined in its narrowest direction.

The light source 111 may be configured to emit infrared light. "Infrared light" refers to light having wavelength(s) in a range having a lower end at about 700 or 800 nm. Using infrared light as the illuminating light may improve the user experience in some applications by that the illumination light used for the depth sensing may be not visible for the human eye. The image sensor 150 may be configured to detect or sense light at the same wavelength range in which the light source emits light.

Figure 2:
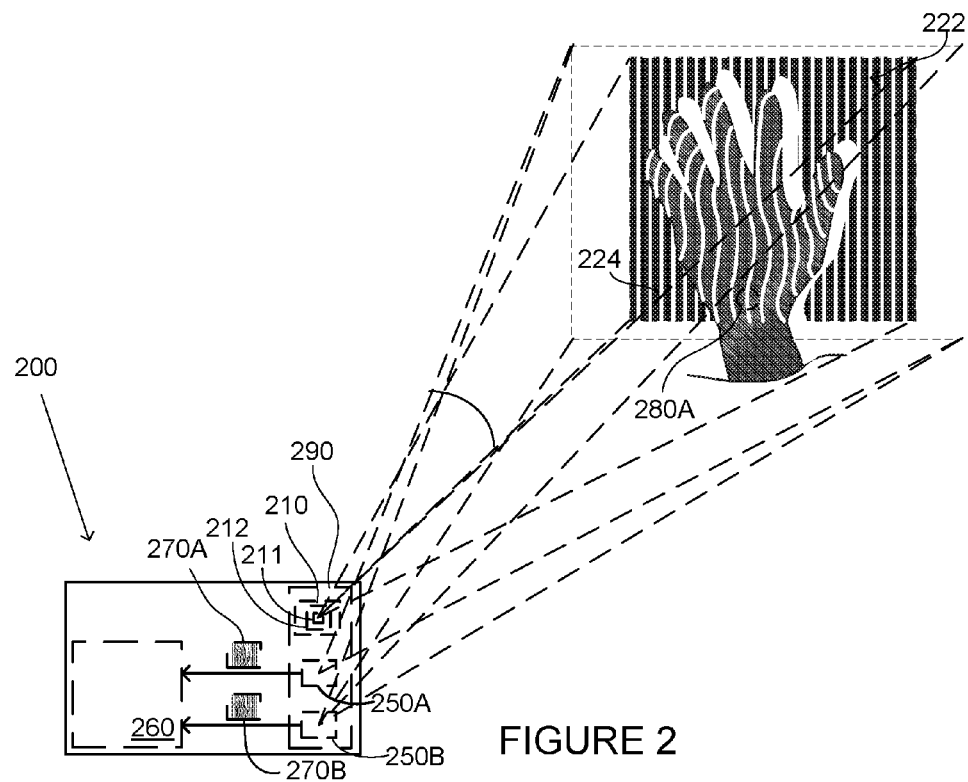

The device 200 of FIG. 2 differs from that of FIG. 1 in that it comprises two image sensors 250A, 250B. Both of those are connected to the processing unit 260. In the embodiment of FIG. 2, the both image sensors are positioned off the illuminating axis 224 and so that they have different viewing directions.

When the device is in use, each of the image sensors capture at least one digital image frame 270A, 270B of the target region 230 illuminated by the interferogram and thus having the structured light pattern 222 thereon.

The one or more digital image frames or the image data thereof are obtained by the processing unit 260 which determines, on the basis of the obtained image data, depth of at least one object location 280A relative to a reference location.

With regard to the operations carried out by the processing units 160, 260 of the devices 100, 200 of FIGS. 1 and 2, there are various possibilities for the processing units to be configured to perform those operations. For example, the processing unit may comprise at least one processor and at least one memory coupled to the at least one processor, the memory storing program code instructions which, when run on the at least one processor, cause the processor to perform the operations action(s) at issue. Alternatively, or in addition, the functionally described features can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In any device, the processing unit may be a separate unit specifically designed for the above operations. Alternatively, it may be a common processing unit of the apparatus also performing other operations and actions. The processing unit may be divided into two or more sub-units with separate purposes.

In the embodiment of FIG. 2, the illuminating arrangement 210 comprising the light source 211 and the interferometer 212, and the image sensors 250A, 250B, are implemented as an imaging module 290 integrated in the device 200.

The imaging module 290 may have all mechanical and optical components, as well as connecting elements between the light source 211, the interferometer 212, and the image sensors 250A, 250B, required for appropriate illumination and image capturing operations of the imaging module. Such imaging module may thereby be implemented as a module which is integrable to various types of devices, and from which module the image data of digital image frames captured by the image sensor may be transmitted to an external processing unit for further processing.

In another embodiment, an imaging module with a single image sensor may be implemented, having an illuminating arrangement and an image sensor which may be in accordance with those discussed above with reference to FIG. 1.

Any of the devices 100, 200 of FIGS. 1 and 2 may be implemented, for example, as a mobile phone or a smart phone. In other embodiments, a device may be implemented as a laptop computer, a tablet computer, or a game controller, e.g. a motion controller, serving as a user interface such as a motion sensing input device of a game console or another interactively controllable device or apparatus. Further, a device may be implemented as a game console itself, or as a motion detector or motion sensing device of a game console. In yet another embodiment, a device may be implemented as a specific depth sensing device or apparatus such as a distance meter or a three dimensional mapping device. Such depth sensing device or device may be a stand-alone device or apparatus. Alternatively, such depth sensing device may be implemented as a modular device or a depth sensing module which is integrable into any kind of device, apparatus, system, where depth information of a target region is utilized for further purposes.

From operational or method point of view, any of the devices 100, 200 may carry out a process which is described in the following. The devices and the units, elements, and parts thereof thus represent examples of entities capable of performing the operations of the process.

The process starts by providing illuminating light which may comprise, or completely consist of, infrared light. An interferogram is formed by amplitude splitting the illuminating light and interferometrically combining the thereby split illumination light.

A target region is illuminated which lies at a distance of at least 10 cm from the location of the interferometrical recombination of the split illumination light by the interferogram. Thereby, a structured light pattern is projected onto the target region. To illuminate the target region by the interferogram, the interferogram and the structured light pattern may be distributed into a field of illumination having a minimum angle of 50 degrees or more.

One or more digital image frames are captured of the target region while it is illuminated by the interferogram.

Image data of the one or more digital image frames are obtained, and depth of at least one object location in the target region relative to a reference location is automatically determined on the basis of image data of the at least one digital image frame.

Carrying out an operation "automatically" refers to performing the operation at issue by one or more appropriate data processing units or modules, such as the processing units discussed above with reference to FIGS. 1 and 2, according to predetermined rules and procedures, without need for any contribution provided or determination performed by a user of a device incorporating such unit or module.

Performing the above process is not limited to the devices of FIGS. 1 and 2. Instead, the process may be carried out by any appropriate device or apparatus or by multiple devices and/or apparatuses having capability to perform those operations.

Figure 3:
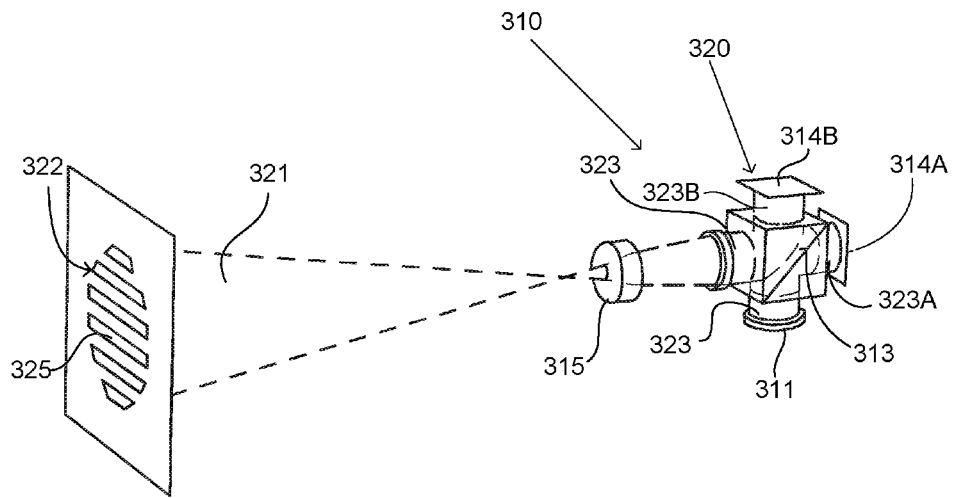
FIGS. 3 and 4 illustrate illuminating arrangements which may produce structured illumination for depth sensing.

The illuminating arrangement 310 of FIG. 3 represents an example of illuminating arrangements which may be used in the devices and imaging modules of FIGS. 1 and 2.

The illuminating arrangement comprises a laser diode 311 serving as a light source. When in use, it emits an illuminating light beam 323 which may be collimated. Further, the illuminating arrangement comprises an amplitude splitting, non-diffractive interferometer 320.

The interferometer 320 comprises a semi-transparent mirror 313 which is positioned in front of the laser diode 311, in the path of the illuminating light beam 323. The semi-transparent mirror, which can also be considered as a partial reflector, serves as a beam splitter splitting the intensity of the illuminating light beam emitted by the laser diode into two portions or sub-beams 323A, 323B.

The semi-transparency or partial reflectivity of the mirror 313 may be achieved, for example, by a glass plate having a thin metal coating thereon.

The interferometer 320 further comprises two reflectors or mirrors 314A, 314B which are positioned at opposite sides of the semi-transparent mirror 313. The two reflectors are not completely parallel but, are positioned at a small angle (not illustrated in the drawing of FIG. 3) relative to each other. The angle may be, for example, in a sub-degree range. For example, it may be 0.05 to 0.3 degrees, e.g. 0.1 degrees.

Those reflectors reflect the sub-beams and transmit them back towards the semi-transparent mirror 313 which recombine them again into one single illuminating light beam 323.

Due to the slight tilt between the two reflectors, the two sub-beams recombine interferometrically so that after the interferometer, the illuminating light beam 323 comprises an interferogram 321 having a plurality of parallel interference lines 325 or fringes forming a structured light pattern 322 which may be projected onto a target region as structured illumination.

The illuminating arrangement 310 of FIG. 3 further comprises a plurality of lenses 315 configured to shape the recombined illuminating light beam 323 and distribute it into an expanding, conical field of illumination.

Figure 4:
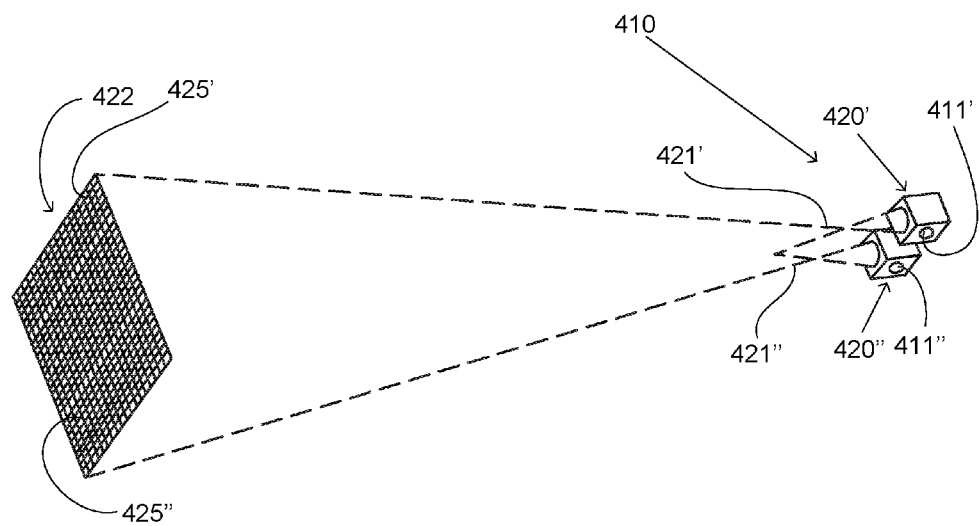

The illuminating arrangement 410 of FIG. 4 represents another example of illuminating arrangements which may be used in the devices and imaging modules of FIGS. 1 and 2.

The illuminating arrangement 410 of FIG. 4 differs from that of FIG. 3 in that it comprises two laser diodes 411', 411" serving as light sources each of which, when in use, emits an illuminating light beam. The illuminating arrangement comprises two amplitude splitting, non-diffractive interferometers 420', 420" which may be, for example, in accordance with the interferometer of FIG. 3. Each of the interferometers are configured to receive the illuminating light beam from one of the laser diodes, and to form an interferogram 421', 421" by using of which a structured light pattern 422 may be projected onto a target region. Thereby, a target region may be illuminated by the two interferograms 421', 421".

In another embodiment, instead of two separate laser diodes, an illuminating arrangement may comprise one single light source, such as a laser diode, the light from which may be split into two illuminating light beams directed to two separate interferometers.

In the embodiment illustrated in FIG. 4, each of the interferograms 421', 421" formed by the two interferometers comprise an array of parallel straight interference lines 425', 425" or fringes, the interference lines of the two interferograms being directed substantially perpendicularly to each other. Thereby the two arrays form a two-dimensional grid of interference lines. In other embodiments, other relative directions of the interference lines may be used. Further, also completely other types of interferograms may be produced, such as interferograms comprising concentric interference rings. The two interferometers may produce different types of interferograms.

An illuminating arrangement comprising two or even more interferometers may provide more freedom in designing the structured light pattern, formed by at least two interferograms, to be projected onto the target domain. Structured light patterns may then be designed and produced which may further improve the accuracy and/or reliability of depth sensing in comparison to embodiments based on one single interferometer and one single interferogram.

Any of the illuminating arrangements 310, 410 of FIGS. 3 and 4 may be implemented as an integral illuminating module incorporating all those components discussed above and having dimensions allowing incorporation into mobile or portable devices. For example, such illumination module may have maximum dimensions of about 5 to 10 millimeters.

In other embodiments, illuminating arrangements may be implemented which utilize other types of light sources instead of a laser diode. For example, a light emitting diode with a narrow emission band may be used to emit an illuminating light beam.

The interferometers 320, 420 of the embodiments of FIGS. 3 and 4 may be designed in accordance with the principles of Michelson type interferometer. In other embodiments, instead of interferometers which are based on beamsplitters and mirrors, other types of amplitude splitting interferometers may be used. For example, an illuminating arrangement may be based on a Fabry-Pérot interferometer. Further, a simple interferometer construction may be implemented as a thin-film interferometer being based on just a thin optically transparent film with two opposite partially reflecting surfaces.

In general, an illuminating arrangement may comprise any appropriate amplitude splitting or non-diffractive interferometer type which is capable of forming an interferogram which may be used for structured illumination for depth sensing.

Figure 5:
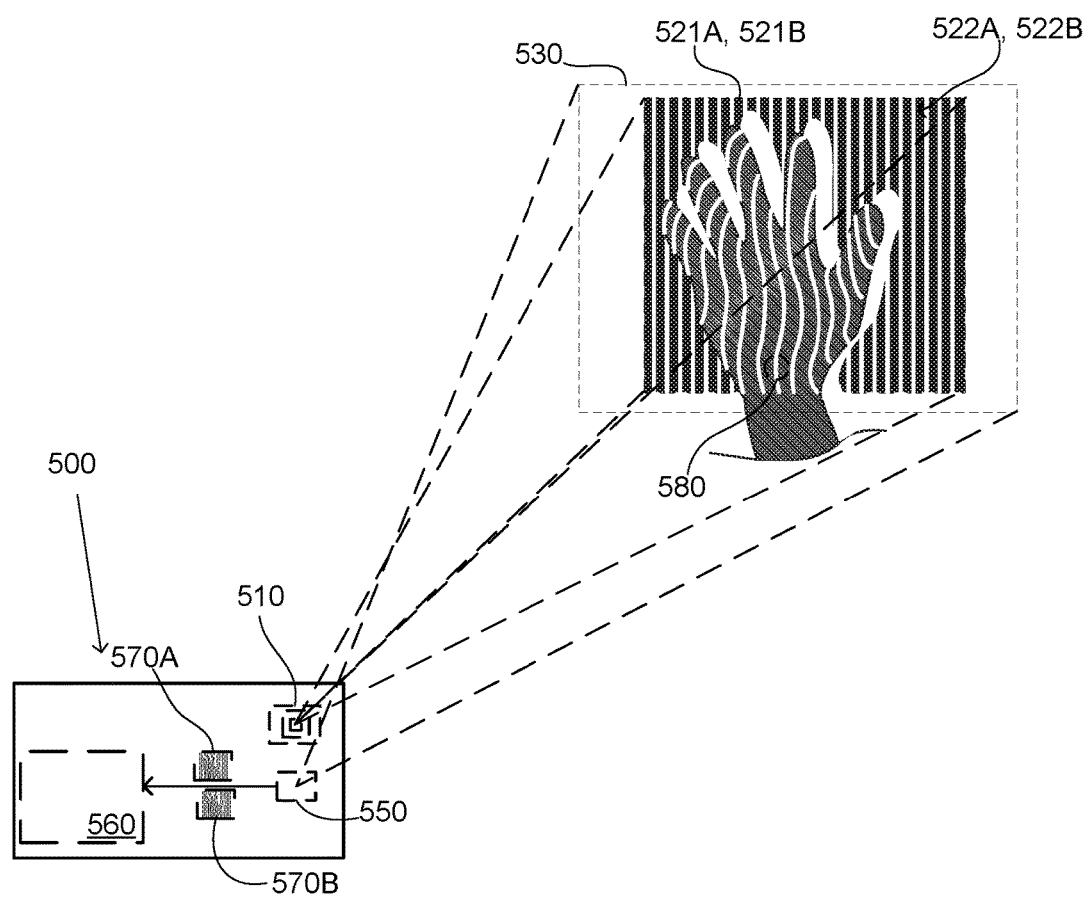

The device 500 of FIG. 5 differs from that of FIG. 1 in that its illuminating arrangement 510 is configured to illuminate, when in use, the target region 530 by two interferograms 521A, 521B which are formed of light with different wavelengths. Each interferogram form a structured light pattern 522A, 522B projected onto the target region 530 one at a time. Due to the illumination by one interferogram at a time, only one interferogram and corresponding structure light pattern is shown in the drawing of FIG. 5.

The image sensor 550 captures, when in use, at least one digital image frame 570A, 570B of the target region for each of the different wavelengths. The processing unit 560 obtains image data of the at least one digital image frames for each wavelength and determines depth of at least one object location 580 in the target region relative to a reference depth on the basis of the thereby obtained image data.

In an alternative embodiment, the illuminating arrangement may illuminate the target region simultaneously by the two interferograms of different wavelengths. Then, the image sensor may capture one or more digital image frames each of which being captured while illuminating the target region by those two wavelengths.

Structured illumination with at least two different wavelengths may provide advantages in depth sensing in that because different wavelengths behave at least slightly differently in the interferometer, the structure light patterns are also somewhat different. Therefore, more information about the depth conditions in the target domain may be achievable than when using one single illumination wavelength.

"Wavelength" refers to a middle wavelength of a wavelength range which is sufficiently narrow to appropriately provide a structured light pattern by the interferogram. Thus, such wavelength range may actually comprise a plurality of adjacent wavelengths.

Some component, device, module, or element "being configured to" operate in a specific manner or to carry our specific operations refers to that component, device, module, or element comprising, or itself serving as, means for" operating in that manner or carry out those operations. For example, an illuminating arrangement which is configured to illuminate a target region by an interferogram means that said illuminating arrangement comprises, or serves as, means for illuminating the target region by the interferogram.

Some embodiments are further discussed shortly in the following.

In a first aspect, a mobile or portable device comprises an illuminating arrangement comprising a light source, and an amplitude splitting interferometer configured to form an interferogram of light emitted by the light source, the illuminating arrangement being configured to illuminate a target region at a distance of at least 10 cm from the device by the interferogram, thereby projecting a structured light pattern onto the target region; an image sensor configured to capture at least one digital image frame of the target region illuminated by the interferogram; and a processing unit configured to obtain image data of the at least one digital image frame, and determine depth of at least one object location in the target region relative to a reference location on the basis of the obtained image data.

From another point of view, a mobile or portable device may comprise means for emitting light; means for forming an interferogram of the emitted light; means for illuminating a target region at a distance of at least 10 cm from the device by the interferogram, thereby projecting a structured light pattern onto the target region; means for capturing at least one digital image frame of the target region illuminated by the interferogram; means for obtaining image data of the at least one digital image frame, and determining depth of at least one object location in the target region relative to a reference location on the basis of the obtained image data. Means for two or more operations may be integrated so that the same means may serve for several operations.

In an embodiment, the illuminating arrangement, or the means for illuminating a target region, is/are configured to distribute the interferogram into a field of illumination having a minimum angle of at least 50 degrees.

In an embodiment, which may be in accordance with the preceding embodiment, the light source, or the means for emitting light, is/are configured to emit infrared light.

In an embodiment, which may be in accordance with any of the preceding embodiments, the light source, or the means for emitting light, comprise(s) a laser diode.

In an embodiment, which may be in accordance with any of the preceding embodiments, the light source and the interferometer, or the means for emitting light and the means for forming an interferogram, are incorporated into an illuminating module.

In an embodiment, which may be in accordance with any of the preceding embodiments, the illuminating arrangement, or the means for forming an interferogram, comprise(s) at least two amplitude splitting interferometers configured to form at least two interferograms, respectively, the illuminating arrangement, or the means for illuminating a target region, being configured to illuminate the target region by the at least two interferograms.

In an embodiment, which may be in accordance with any of the preceding embodiments, the illuminating arrangement, or the means for emitting light and the means for forming an interferogram, comprise(s) at least two light sources and at least two amplitude splitting interferometers, each interferometer being configured to form an interferogram of light emitted by one of the at least two light sources, the at least two interferometers thereby forming at least two interferograms, the illuminating arrangement, or the means for illuminating a target region, being configured to illuminate a target region by the at least two interferograms.

In an embodiment, which may be in accordance with any of the last two preceding embodiments, the at least two interferograms comprise a first interferogram comprising a first array of interference lines extending in a first direction for projecting a first structured light pattern onto the target region, and a second interferogram comprising a second array of interference lines extending in a second direction differing from the first direction for projecting a second structured light pattern onto the target region, the first and the second arrays of interference lines forming a two-dimensional grid of interference lines.

In an embodiment, which may be in accordance with any of the preceding embodiments, the illuminating arrangement, or the means for illuminating a target region, is/are configured to illuminate the target region by at least two interferograms of light with different wavelengths, thereby projecting at least two structured light patterns with different wavelengths onto the target region; the at least one image sensor, or the means for capturing at least one digital image frame, is/are configured to capture at least one digital image frame of the target region illuminated by each of the different wavelengths; and the processing unit, or the means for obtaining image data and determining depth, is/are configured to obtain image data of the at least one digital image, and determine the depth of the at least one object location in the target region on the basis of the obtained image data.

In the above embodiment, the target region may be illuminated by one of the different wavelengths at a time. Then, the at least one digital image frame may comprise at least one digital image frame captured for each of the illumination wavelengths. Alternatively, the target region may be illuminated by each of the different wavelengths simultaneously.

In an embodiment, which may be in accordance with any of the preceding embodiments, the reference location is defined relative to the device. In an alternative embodiment, the reference location is defined relative to a location in the target region.

In an embodiment, which may be in accordance with any of the preceding embodiments, the device comprises at least two image sensors, each being configured to capture at least one digital image frame of the target region illuminated by the interferogram; the processing unit, or the means for obtaining image data and determining depth, being configured to obtain image data of the at least one digital image frames of the at least two image sensors, and determine depth of at least one object location in the target region relative to a reference location on the basis of the obtained image data.

In an embodiment, which may be in accordance with any of the preceding embodiments, the device is implemented as one of a mobile phone, a smart phone, a laptop computer, a tablet computer, a game controller, a game console, and a depth sensing device.

In a second aspect, an imaging module integrable into a mobile or portable device may be implemented. The imaging module comprises a light source configured to produce an illuminating light beam; a non-diffractive interferometer configured to form an interferogram, the imaging module being configured to emit the interferogram about an illuminating axis, to be projected as a structured light pattern, having areas with different light intensity, onto a target region at a distance of at least 10 cm from the imaging module; and an image sensor configured to capture a digital image frame of the target region illuminated by the structured light pattern projected onto it, the image sensor being positioned off the illuminating axis to allow determining depth of at least one object location in the target region relative to a reference location on the basis of image data of the digital image frame.

In an embodiment, the imaging module is configured to emit the interferogram into a field of illumination having a minimum angle of at least 50 degrees.

In an embodiment, which may be in accordance with the preceding embodiment, the imaging module comprises two image sensors each being configured to capture a digital image frame of the target region illuminated by the structured light pattern projected onto it, the two image sensors being positioned off the illuminating axis, with viewing directions different from each other, to allow determining the depth of at least one object location in the target region relative to a reference location on the basis of image data of the digital image frames captured by the two image sensors.

In a third aspect, a method may be carried out comprising providing illuminating light; forming an interferogram by amplitude splitting the illuminating light and interferometrically combining the split illumination light; illuminating a target region at a distance of at least 10 cm by the interferogram, thereby projecting a structured light pattern onto the target region; capturing at least one digital image frame of the target region illuminated by the interferogram; obtaining image data of the at least digital image frame, and automatically determining depth of at least one object location in the target region relative to a reference location on the basis of the obtained image data.

Each of the operations may be carried out at least partially automatically by any appropriate means, comprising one or more elements, units, or devices. For example, there may be a processing unit controlling, when in use, an illuminating arrangement comprising one or more light sources and one or more interferometers, and one or more image sensors, thereby causing the operations of providing light, forming an interferogram, illuminating the target region by the interferogram(s), and capturing the digital image frame(s). The same or another processing unit may carry out the operations of obtaining the image data and determining the depth of at least one object location. More examples of suitable entities to carry out the operations are given above with reference to the first and the second aspects.

In an embodiment, in illuminating the target region by the interferogram, the structured light pattern is distributed into a field of illumination having a minimum angle of at least 50 degrees.

In an embodiment, which may be in accordance with the preceding embodiment, the method comprises forming at least two interferograms; and illuminating the target region by the at least two interferograms; wherein the at least one digital image frame is captured of the target region while illuminating it by the at least two interferograms.

In an embodiment, which may be in accordance with any of the two preceding embodiments, the illuminated light comprises infrared light.

Although some of the present embodiments may be described and illustrated as being implemented in specific type of devices such as a smartphone, a mobile phone, or a tablet computer, a lap top computer, a game console or game controller, these are only examples of a device and not a limitation. As those skilled in the art will appreciate, the present embodiments are suitable for application in a variety of different types of devices and apparatuses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A mobile or portable device comprising
an illuminating arrangement comprising a light source, and at least two amplitude splitting interferometers configured to form at least two interferograms of light emitted by the light source, at least one of the amplitude splitting interferometers comprising two flat reflectors tilted with respect to each other, the illuminating arrangement being configured to illuminate a target region at a distance of from the device by the at least two interferograms, thereby configured to project a structured light pattern onto the target region;
an image sensor configured to capture at least one digital image frame of the target region illuminated by the at least two interferograms; and
a processing unit configured to obtain image data of the at least one digital image frame, and configured to determine a depth of at least one object location in the target region relative to a reference location on the basis of the obtained image data.

2. A device as defined in claim 1, wherein the illuminating arrangement is configured to distribute the at least two interferograms into a field of illumination having a minimum angle of at least 50 degrees and wherein the two flat reflectors have a slight tilt with respect to each other.

3. A device as defined in claim 1, wherein the light source is configured to emit infrared light.

4. A device as defined in claim 1, wherein the light source comprises a laser diode.

5. A device as defined in claim 1, wherein the light source and the at least two interferometers are incorporated into an integral illuminating module and at least one of the two flat reflectors is tilted with respect to incoming light emitted from the light source.

6. A device as defined in claim 1, wherein the illuminating arrangement being configured to illuminate the target region at a distance of at least 10 centimeters from the device.

7. A device as defined in claim 1, wherein the illuminating arrangement comprises at least two light sources and the at least two amplitude splitting interferometers, each interferometer being configured to form an interferogram of light emitted by one of the at least two light sources, the at least two interferometers thereby forming the at least two interferograms.

8. A device as defined in claim 7, wherein the at least two interferograms comprise a first interferogram comprising a first array of interference lines extending in a first direction for projecting a first structured light pattern onto the target region, and a second interferogram comprising a second array of interference lines extending in a second direction differing from the first direction for projecting a second structured light pattern onto the target region, the first and the second arrays of interference lines forming a two-dimensional grid of interference lines.

9. A device as defined in claim 1, wherein the illuminating arrangement is configured to illuminate the target region by the at least two interferograms of light with different wavelengths, thereby projecting at least two structured light patterns with different wavelengths onto the target region; the at least one image sensor being configured to capture at least one digital image frame of the target region illuminated by each of the different wavelengths; the processing unit being configured to obtain image data of the at least one digital image frame, and determine the depth of the at least one object location in the target region on the basis of the obtained image data.

10. A device as defined in claim 1, wherein the reference location is defined relative to the device.

11. A device as defined in claim 1, wherein the reference location is defined relative to a location in the target region.

12. A device as defined in claim 1, comprising at least two image sensors, each being configured to capture at least one digital image frame of the target region illuminated by the at least two interferograms; the processing unit being configured to obtain image data of the at least one digital image frames of the at least two image sensors, and determine depth of at least one object location in the target region relative to a reference location on the basis of the obtained image data.

13. A device as defined in claim 1, implemented as one of a mobile phone, a smart phone, a laptop computer, a tablet computer, a game controller, a game console, and a depth sensing device.

14. An imaging module comprising:
a light source configured to produce an illuminating light beam;
at least two non-diffractive interferometers configured to form at least two interferograms, at least one of the non-diffractive interferometers comprising two flat reflectors tilted with respect to each other, the imaging module configured to emit the at least two interferograms about an illuminating axis, that is configured to be projected as a structured light pattern, onto a target region at a distance of from the imaging module; and
an image sensor configured to capture a digital image frame of the target region illuminated by the structured light pattern of the at least two interferograms projected onto the target region, the image sensor configured to be positioned off the illuminating axis, and configured to allow determining a depth of at least one object location in the target region relative to a reference location on the basis of image data of the digital image frame.

15. An imaging module as defined in claim 14, configured to emit the at least two interferograms into a field of illumination having a minimum angle of at least 50 degrees.

16. An imaging module as defined in claim 14, comprising two image sensors each being configured to capture a digital image frame of the target region illuminated by the structured light pattern projected onto it, the two image sensors being positioned off the illuminating axis, with viewing directions different from each other, to allow determining the depth of at least one object location in the target region relative to a reference location on the basis of image data of the digital image frames captured by the two image sensors.

17. A method comprising
providing illuminating light;
forming at least two interferograms by amplitude splitting the illuminating light using two flat reflectors tilted with respect to each other and interferometrically combining the split illumination light;
illuminating a target region by the at least two interferograms, thereby projecting a structured light pattern onto the target region;
capturing at least one digital image frame of the target region while illuminated by the at least two interferograms; and
obtaining image data of the at least digital image frame, and automatically determining with a processing unit, a depth of at least one object location in the target region relative to a reference location on the basis of the obtained image data.

18. A method as defined in claim 17, wherein in illuminating the target region by the at least two interferograms, the structured light pattern is distributed into a field of illumination having a minimum angle of at least 50 degrees.

19. A method as defined in claim 17, comprising illuminating the target region by the at least two interferograms at a distance of at least 10 centimeters.

20. A method as defined in claim 17, wherein the illuminated light comprises infrared light.

* * * * *